United States Patent
Nomura et al.

(10) Patent No.: US 7,116,457 B2
(45) Date of Patent: Oct. 3, 2006

(54) OPTICAL SCANNING APPARATUS AND IMAGE FORMING APPARATUS

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/042,811

(22) Filed: Jan. 25, 2005

(65) Prior Publication Data

US 2005/0179972 A1 Aug. 18, 2005

(30) Foreign Application Priority Data

Feb. 10, 2004 (JP) .............................. 2004-033242

(51) Int. Cl.
G02B 26/08 (2006.01)
(52) U.S. Cl. ...................... 359/224; 359/196
(58) Field of Classification Search ................ 359/212, 359/213, 214, 215, 223, 224, 225, 226
See application file for complete search history.

(56) References Cited

U.S. PATENT DOCUMENTS 5,959,760 A * 9/1999 Yamada et al. ............. 359/224

2003/0038693 A1 2/2003 Tokuda et al.

FOREIGN PATENT DOCUMENTS

| JP | 2001-33727 | | 2/2001 |
|---|---|---|---|
| JP | 2001-91889 | | 4/2001 |
| JP | 2001-117043 | | 4/2001 |
| JP | 2000-3057586 | * | 2/2003 |
| JP | 2003-57586 | | 2/2003 |

* cited by examiner

Primary Examiner—Euncha P. Cherry
(74) Attorney, Agent, or Firm—Hogan & Hartson LLP

(57) ABSTRACT

In an optical scanning apparatus in which a movable plate 653 pivots at a high speed, friction between the movable plate 653 and air generates heat. The amount of generated heat is relatively large in a main scanning direction but relatively small in a direction of a pivot axis. A light beam is converged in a sub scanning direction Y within a sub-scanning surface, and is focused as a line image in the vicinity of a deflection mirror surface 651 in a deflector 65. This reduces the size of the deflection mirror surface 651 in the direction Y of the pivot axis (the sub scanning direction). Meanwhile, a second distance is longer than a first distance in the main scanning direction, and the movable plate 653 and vertical side portions (second adjacent portions) 652b are widely apart from each other in the main scanning direction X. This reduces air resistance against the movable plate 653, and hence, the amount of heat generation.

4 Claims, 11 Drawing Sheets

OPTICAL SCANNING APPARATUS AND IMAGE FORMING APPARATUS

CROSS REFERENCE TO RELATED APPLICATION

The disclosure of Japanese Patent Application No. 2004-33242 filed Feb. 10, 2004 including specification, drawings and claims is incorporated herein by reference in its entirety.

BACKGROUND OF THE INVENTION

1. Field of the Invention

The present invention relates to an optical scanning apparatus which makes a light beam scan on a surface-to-be-scanned in a main scanning direction and an image forming apparatus which forms an electrostatic latent image using such an optical scanning apparatus.

2. Description of the Related Art

An apparatus which uses this type of optical scanning apparatus is an image forming apparatus such as a laser printer, a copier machine and a facsimile machine. For instance, in the apparatus described in Japanese Patent Application Laid-Open Gazette No. 63-279220, a laser beam modulated in accordance with image data impinges upon a deflector via a collimator lens, a first cylindrical lens and a reflection mirror and is hence deflected. More specifically, the specific structure of the apparatus described in Japanese Patent Application Laid-Open Gazette No. 63-279220 is as follows.

In this optical scanning apparatus, a laser beam emitted from a semiconductor laser passes through a collimator lens and a cylindrical lens, and the laser beam is accordingly shaped into such a laser beam whose cross sectional shape is a sideways-elongated elliptic shape which elongates in the main scanning direction. This laser beam impinges upon a reflecting mirror of a deflector along a main scanning surface.

To solve various problems which accompany use of a polygon mirror or a galvanometer mirror as a deflector, this apparatus uses a deflector which is manufactured utilizing a micro machining technique. In short, utilizing a photolithographic technique, an etching technique, etc., a substrate of crystal, glass, silicon or the like is processed into an optical deflection element in which a drive coil, a reflecting mirror and a ligament are formed integral with a frame. The deflector comprising this optical deflection element deflects a laser beam which is incident upon the reflecting mirror, as a voltage is applied upon the drive coil and the reflecting mirror can consequently pivot about a pivot axis which is approximately orthogonal to the main scanning direction.

The laser beam deflected by the deflector is imaged on an image forming member (which corresponds to the "latent image carrier" of the present invention) via a scanning lens and a second cylindrical lens. An electrostatic latent image which corresponds to image data is formed on the image forming member in this manner.

SUMMARY OF THE INVENTION

By the way, for size reduction of an optical scanning apparatus which uses a deflector, it is preferable that the respective portions of the deflector, e.g., the reflecting mirror and the frame are arranged close to each other. However, since the reflecting mirror which pivots at a high speed moves in the vicinity of the frame, heat developed with the pivoting operation may cause a great problem. That is, when the reflecting mirror pivots at a high speed, friction between the reflecting mirror which is pivoting and air around the reflecting mirror generates heat and air fluctuates in the space around the reflecting mirror under the influence of the heat. Since the index of refraction of air in the space where there is the fluctuation changes, when the light beam travels through the space, the scanning position of the light beam gets displaced, and the quality of an image deteriorates. This problem becomes greater as the distance between the reflecting mirror and the frame in the main scanning direction becomes shorter. Further, in the case that the laser beam which is shaped like an elongated strip which elongates in the main scanning direction is guided toward the reflecting mirror as in the conventional apparatus described above, the size of the reflecting mirror in the main scanning direction gets longer, the travel distance of the edge of the reflecting mirror becomes greater, and the above-mentioned problem becomes even more serious.

For the purpose of size reduction of the optical scanning apparatus and faster optical scanning, it is thus necessary to adequately consider not only size reduction of the respective portions of the apparatus and the layout of the respective portions of the apparatus but thermal influence due to pivoting of the reflecting mirror (movable member) as well. However, these matters are not taken into consideration or addressed sufficiently in the conventional apparatus.

The present invention has been made in light of the problems described above, and accordingly, an object of the present invention is to provide a compact-size optical scanning apparatus which makes a light beam scan on a surface-to-be-scanned at a high speed and an image forming apparatus which uses such an optical scanning apparatus.

According to a first aspect of the present invention, there is provided an optical scanning apparatus in which a light beam scans on a surface-to-be-scanned in a main scanning direction, comprising: a deflector which comprises a movable member which has a deflection mirror surface which reflects an incident light beam toward the surface-to-be-scanned, first adjacent portions which are fixedly disposed adjacent to the movable member over a first distance from the movable member on the both sides of the movable member in a direction of a pivot axis which is approximately orthogonal to the main scanning direction, second adjacent portions which are fixedly disposed adjacent to the movable member over a second distance from the movable member in the main scanning direction, and beams which elongate in the direction of the pivot axis and link the movable member to the first adjacent portions to thereby hold the movable member such that the movable member can freely pivot about the pivot axis, the deflector making the movable member pivot about the pivot axis, thereby deflecting the incident light beam in the main scanning direction; a light source which emits the light beam; a first optical system which shapes the light beam from the light source into an elongated cross sectional shape which elongates in the main scanning direction, and makes the light beam impinge upon the deflection mirror surface; and a second optical system which makes the light beam deflected by the deflection mirror surface form an image on the surface-to-be-scanned, wherein the second distance is longer than the first distance.

According to a second aspect of the present invention, there is provided an image forming apparatus, comprising: the optical scanning apparatus; and a latent image carrier, wherein the optical scanning apparatus makes the light beam scan on a surface of the latent image carrier, thereby forming an electrostatic latent image on the latent image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
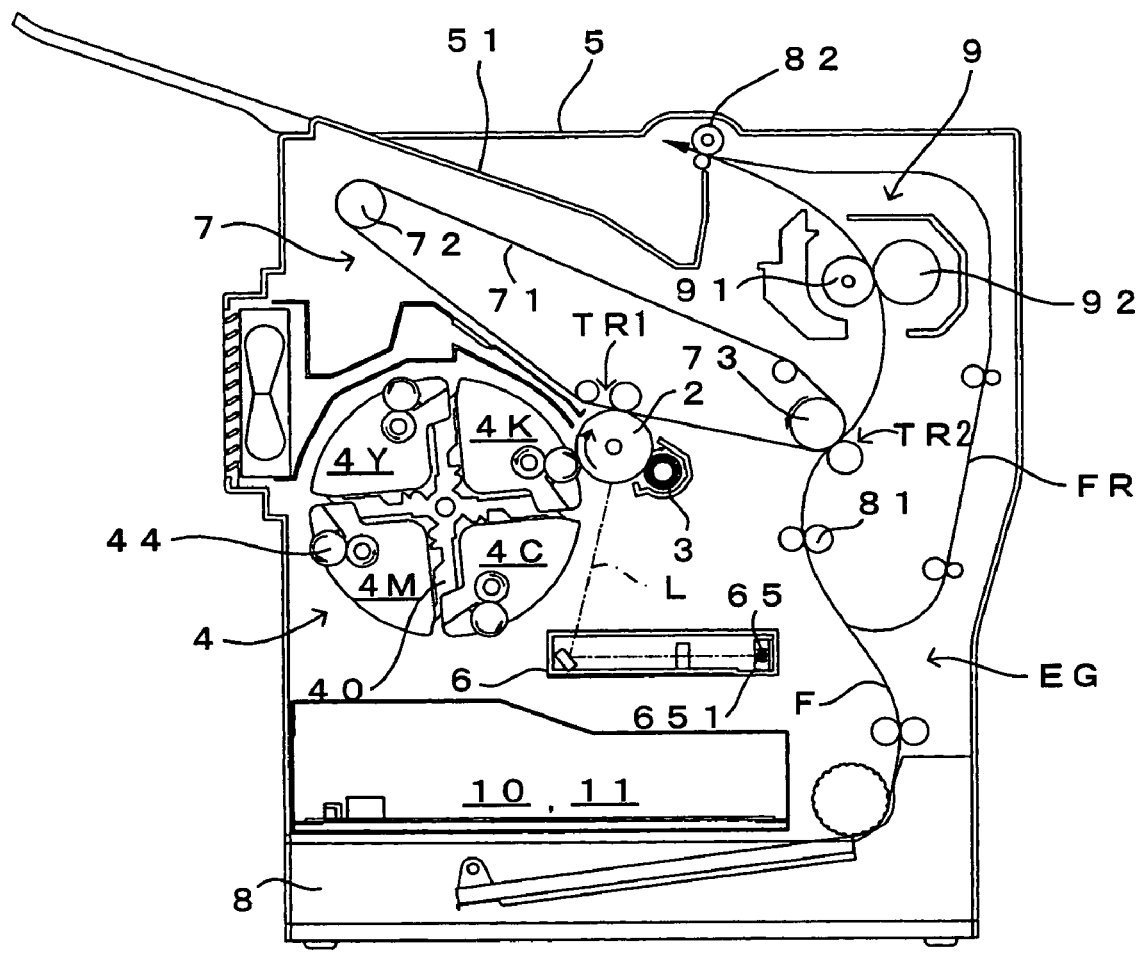
FIG. 1 is a drawing which shows one embodiment of an image forming apparatus according to the present invention.
Figure 2:
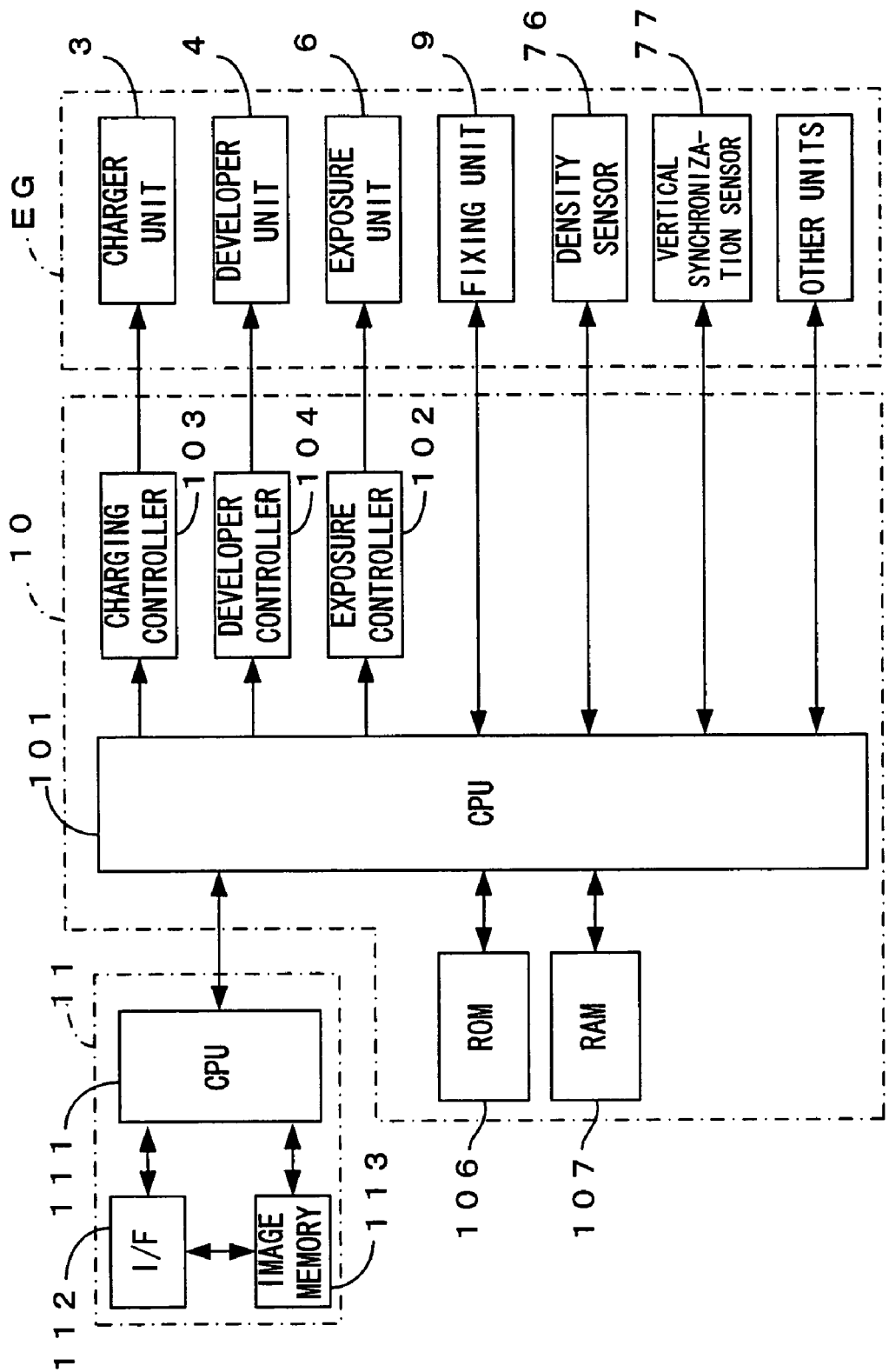
FIG. 2 is a block diagram which shows the electric structure of the image forming apparatus which is shown in FIG. 1.

FIG. 1 is a drawing which shows an embodiment of an image forming apparatus according to the present invention. FIG. 2 is a block diagram which shows the electric structure of the image forming apparatus which is shown in FIG. 1. This image forming apparatus is a color printer of the so-called 4-cycle type. In this image forming apparatus, when a print command is fed to a main controller 11 from an external apparatus such as a host computer in response to a user's image formation request, an engine controller 10 controls respective portions of an engine part EG in accordance with the print instruction received from the main controller 11 of a CPU 111, and an image which corresponds to the print instruction is formed on a sheet which may be a copy paper, a transfer paper, a plain paper or a transparency for an overhead projector.

In the engine part EG, a photosensitive member 2 is disposed so that the photosensitive member 2 can freely rotate in the arrow direction (sub scanning direction) shown in FIG. 1. Around the photosensitive member 2, a charger unit 3, a rotary developer unit 4 and a cleaner (not shown) are disposed along the direction in which the photosensitive member rotates. A charging controller 103 is electrically connected with the charger unit 3, for application of a predetermined charging bias upon the charger unit 3. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main body 5 as one integrated unit.

An exposure unit 6 emits a light beam L toward the outer circumferential surface of the photosensitive member 2 thus charged by the charger unit 3. The exposure unit 6 makes the light beam L scan on the photosensitive member 2 based on an electric signal from an exposure controller which will be described later, whereby an electrostatic image which reflects an image signal is formed. The exposure unit 6 is thus an optical scanning apparatus according to the present invention, and the structure and operations of the exposure unit will be described in detail later.

The developer unit 4 develops thus formed electrostatic latent image with toner. In other words, in this embodiment, the developer unit 4 comprises a support frame 40 which is axially disposed for free rotations, and also a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 by a developer roller 44 which carries the toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72, 73, etc., and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the respective portions of the apparatus operate under the control of the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main body 5, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 for storage of image data fed from an external apparatus such as a host computer via an interface 112. Denoted at 106 is a ROM which stores a computation program executed by a CPU 101, control data for control of the engine part EG, etc. Denoted at 107 is a RAM which temporarily stores a computation result derived by the CPU 101, other data, etc.

Figure 3:
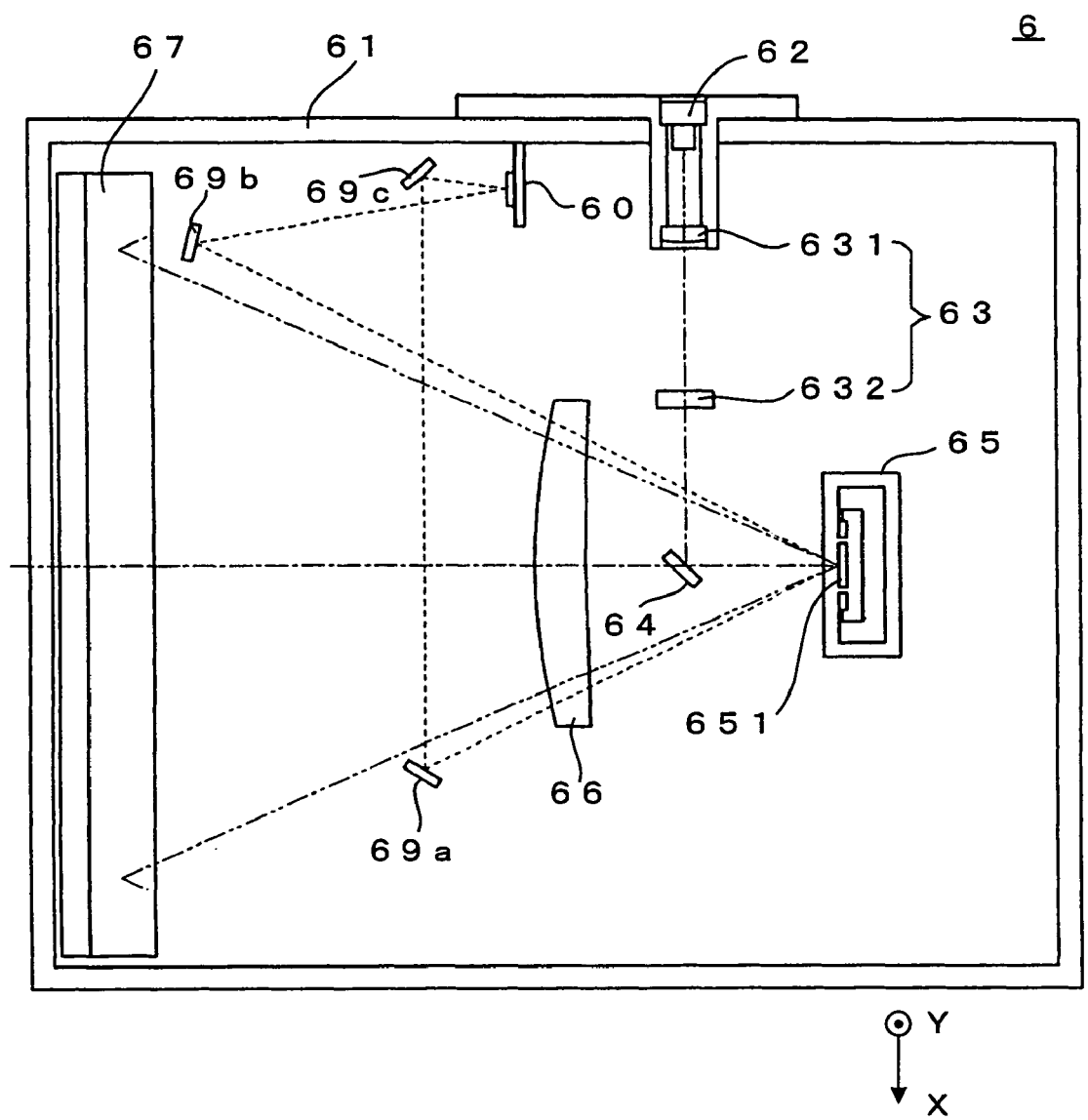
FIG. 3 is a main-scanning cross sectional view of an exposure unit which is disposed in the image forming apparatus which is shown in FIG. 1.
Figure 4:
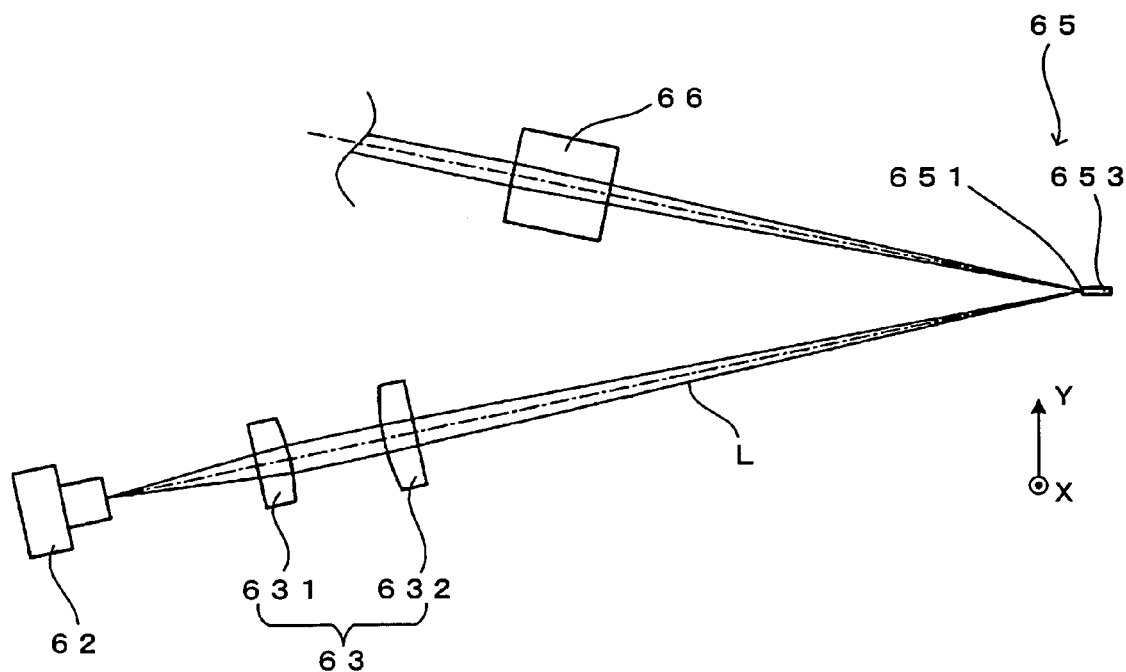
FIG. 4 is a sub-scanning cross sectional view of the exposure unit which is disposed in the image forming apparatus which is shown in FIG. 1.
Figure 5:
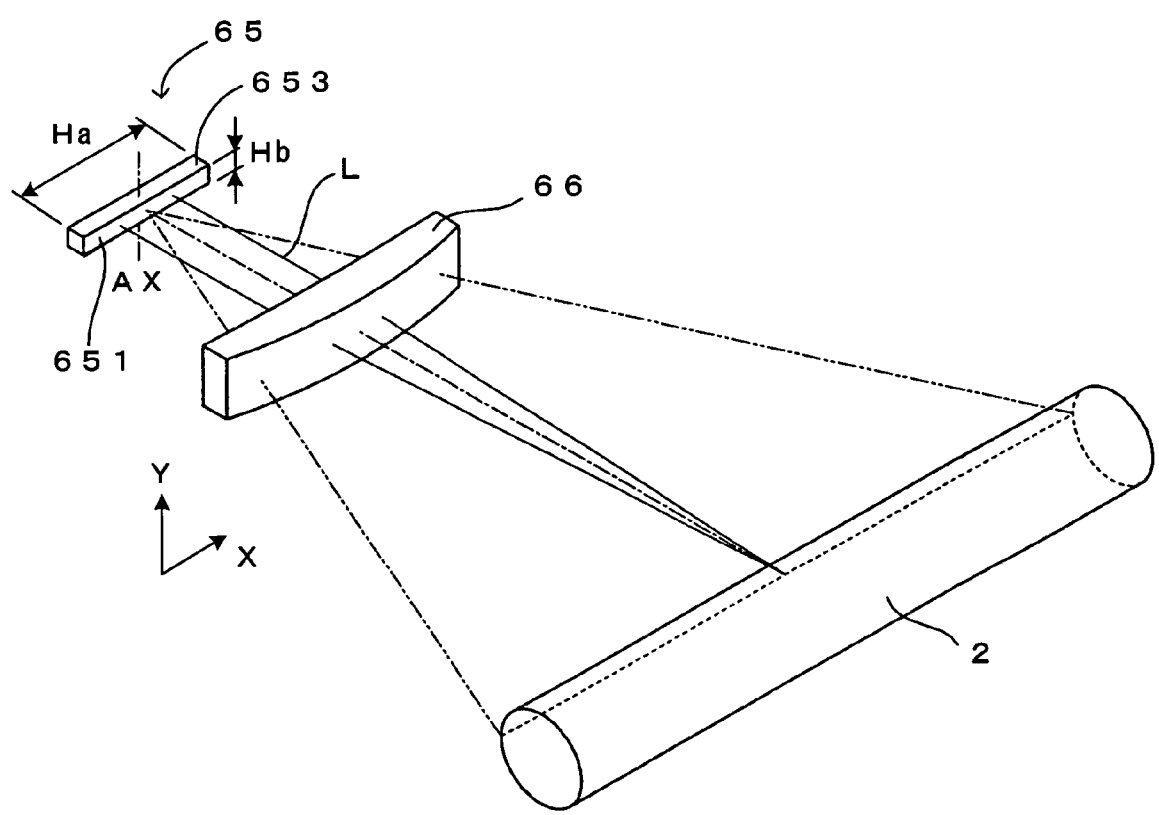
FIG. 5 is a perspective view which shows imaging of a deflection light beam.
Figure 6:
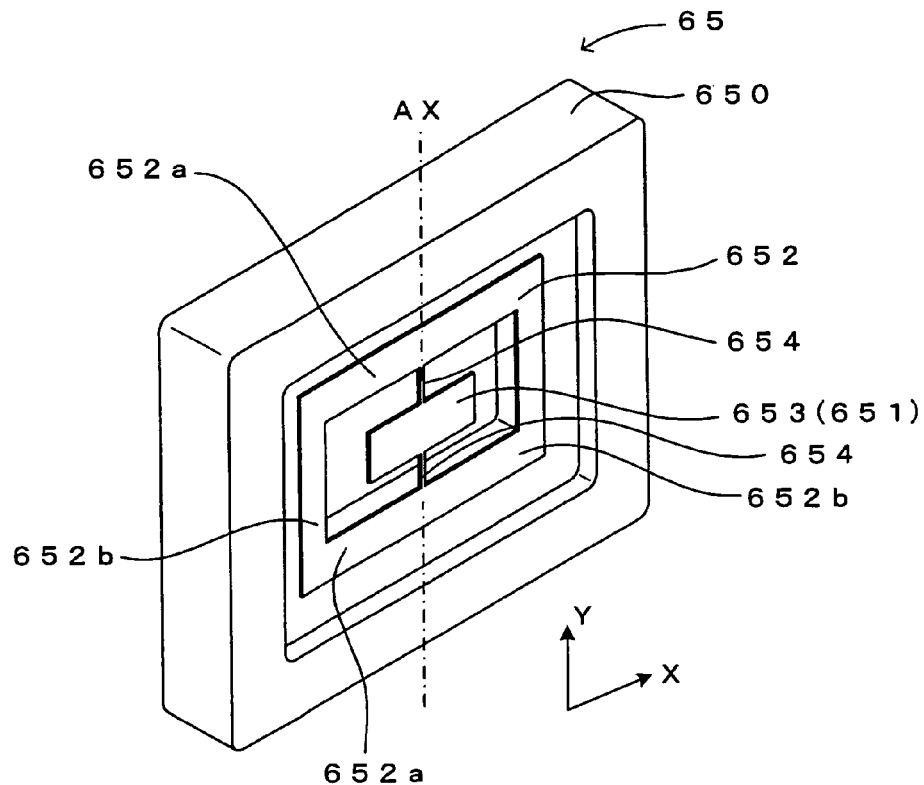
FIG. 6 is a drawing of a deflector which is one of components which form the exposure unit.
Figure 7:
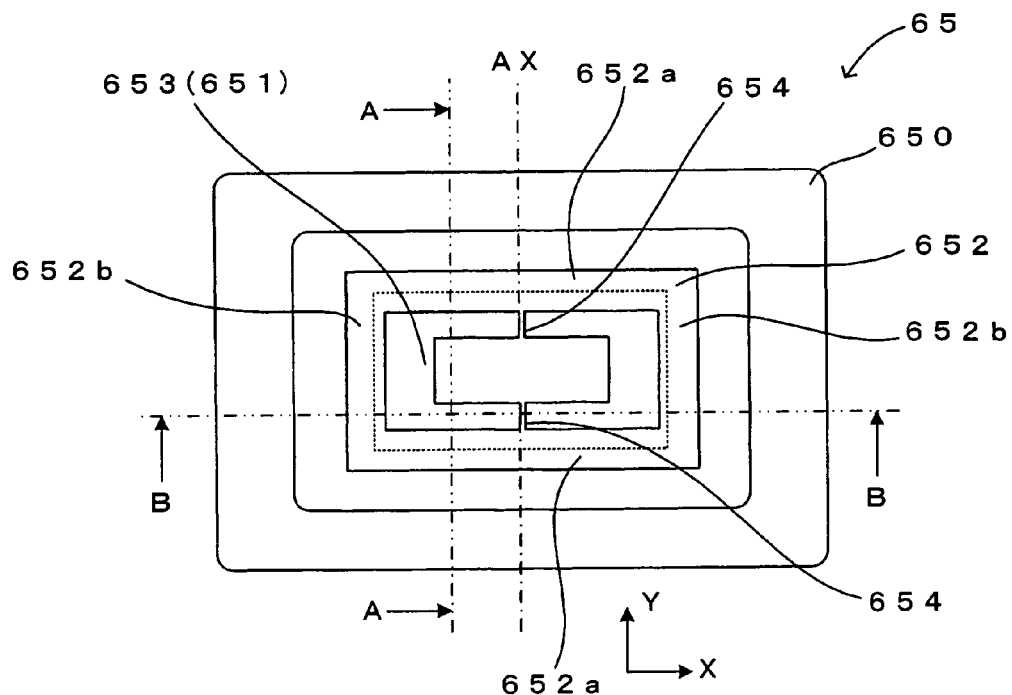
FIG. 7 is a drawing of the deflector which is one of components which form the exposure unit.
Figure 8:
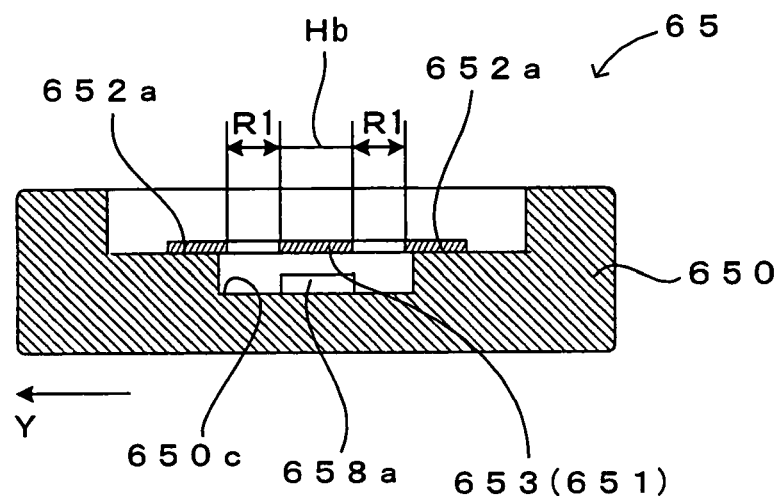
FIG. 8 is a cross sectional view taken on line A—A of FIG. 7.
Figure 9:
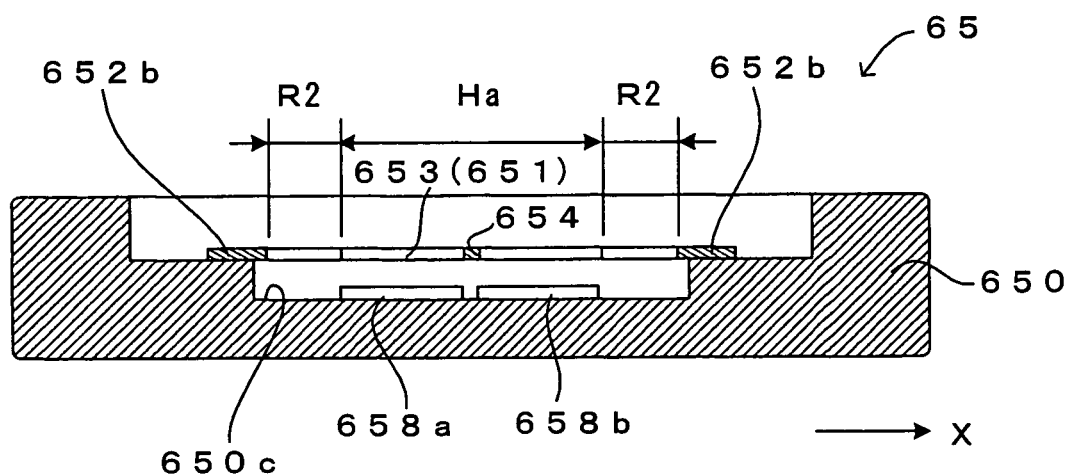
FIG. 9 is a cross sectional view taken on line B—B of FIG. 7.
Figure 10:
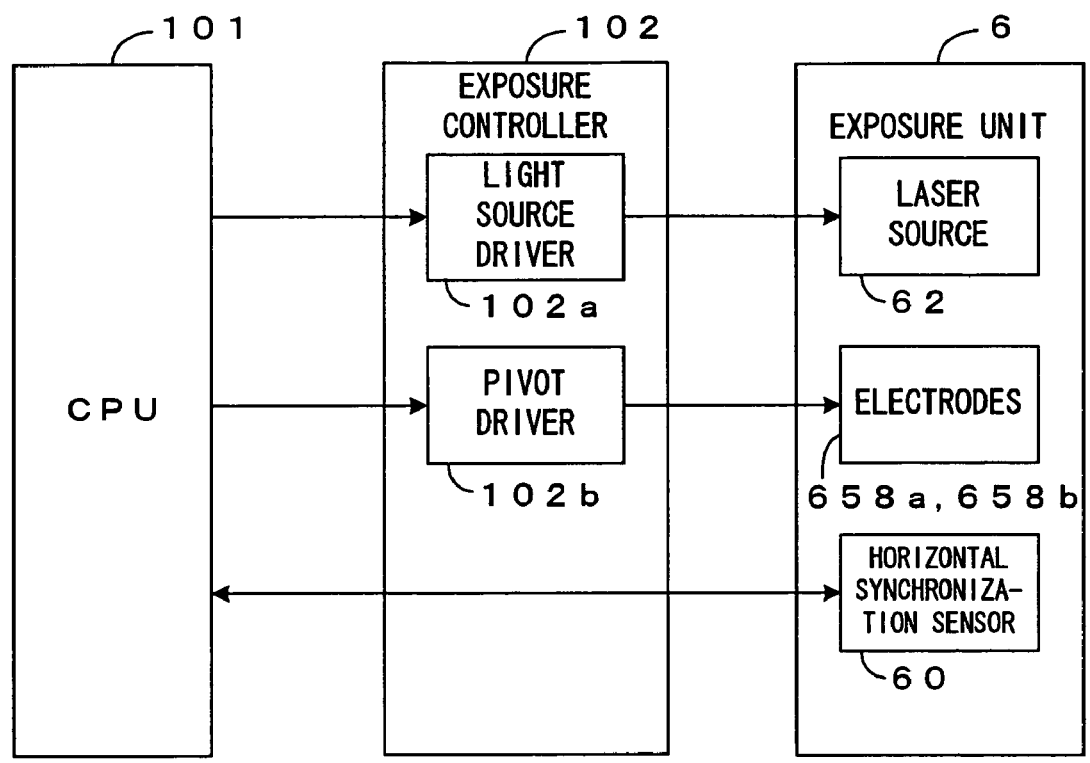
FIG. 10 is a block diagram which shows the structures of the exposure unit and an exposure controller.

FIG. 3 is a main-scanning cross sectional view showing the structure of the exposure unit which is disposed in the image forming apparatus which is shown in FIG. 1. FIG. 4 is a sub-scanning cross sectional view of the exposure unit. FIG. 5 is a perspective view which shows imaging of a scanning light beam. FIGS. 6 and 7 are drawings of a deflector which is one of components which form the exposure unit. FIG. 8 is a cross sectional view taken on line A—A of FIG. 7, and FIG. 9 is a cross sectional view taken on line B—B of FIG. 7. FIG. 10 is a block diagram which shows the structures of the exposure unit and the exposure controller. The structure and operations of the exposure unit 6 will now be described in detail with reference to these drawings.

The exposure unit 6 comprises an exposure housing 61. A single laser source 62 is fixed to the exposure housing 61, permitting emission of a light beam from the laser source 62. The laser source 62 is electrically connected with a light source driver 102a of an exposure controller 102 as shown in FIG. 10. Hence, the light source driver 102a controls ON and OFF of the laser source 62 in accordance with image data, and the laser source 62 emits a light beam modulated in accordance with the image data. The laser source 62 thus functions as the "light source" of the present invention.

Further, to make the light beam from the laser source 62 scan and expose the surface of the photosensitive member 2 (surface-to-be-scanned), a collimator lens 631, a cylindrical lens 632, a mirror 64, a deflector 65, a scanning lens 66 and a return mirror 67 are disposed inside the exposure housing 61. In other words, after shaped into collimated light of a proper size by the collimator lens 631, the light beam from the laser source 62 impinges upon the cylindrical lens 632 which has power only in a sub scanning direction Y. This collimated light is then converged only in the sub scanning direction Y and imaged in the shape of a line in the vicinity of a deflection mirror surface 651 of the deflector 65. In this embodiment, the collimator lens 631 and the cylindrical lens 632 thus function as a first optical system 63 which shapes the light beam from the laser source 62 into an elongated cross sectional shape which is long in a main scanning direction X and makes the light beam impinge upon the deflection mirror surface 651.

The deflector 65 is made using a micro machining technique which is an application of semiconductor manufacturing techniques and which aims at forming an integrated micro machine on a semiconductor substrate, and therefore, the deflector 65 is capable of deflecting a light beam reflected by the deflection mirror surface 651 in the main scanning direction X. To be more specific, the deflector 65 has the following structure.

In the deflector 65, as shown in FIGS. 6 and 7, a frame member is formed which is obtained by processing a part of a single crystal substrate of silicon (hereinafter referred to a "silicon substrate") 652, the frame member being a combination of two horizontal side portions 652a and two vertical side portions 652b. The silicon substrate 652 is attached to a frame 650 in such a manner that the side portions 652a and 652b of the frame member cover the circumferential edge portion of the opening of a concave 650c which is formed in the frame 650 of the deflector 65.

Further, at a central section of the silicon substrate 652, a movable plate 653 is disposed to the frame member so that the movable plate 653 can freely pivot about a pivot axis AX which elongates in the sub scanning direction Y which is approximately orthogonal to the main scanning direction X. In other words, the horizontal side portions 652a are apart by a first distance R1 from the movable plate 653 respectively on the both sides of the movable plate 653 in the direction Y of the pivot axis (FIG. 8), and the movable plate 653 is elastically supported to the horizontal side portions 652a of the silicon substrate 652 by torsion springs (beams) 654. In the main scanning direction X, the movable plate 653 is apart by a second distance R2 from the vertical side portions 652b (FIG. 9). Thus, in this embodiment, the horizontal side portions 652a and the vertical side portions 652b correspond to the "first adjacent portions" and the "second adjacent portions" of the present invention respectively, and the movable plate 653 as it is apart from these can freely pivot about the pivot axis AX. In a central section of the movable plate 653, a film of aluminum or the like is coated as the deflection mirror surface 651. In this embodiment, for the reason which will be described later, the second distance R2 is longer than the first distance R1. Further, the movable plate 653 has an elongated shape which is long in the main scanning direction X as shown in FIG. 6, and the width Hb of the movable plate 653 in the direction of the pivot axis (sub scanning direction) is shorter than the width Ha in the main scanning direction. This will be described later.

In addition, in the inner bottom surface of the concave 650c, electrodes 658a and 658b are fixed at locations opposed against the both ends of the movable plate 653

(FIGS. 8 and 9). These two electrodes 658a and 658b function as electrodes which are for driving the movable plate 653 into the pivoting action about the pivot axis AX. In short, the electrodes 658a and 658b are electrically connected with a pivot driver 102b of the exposure controller 102, and when a voltage is applied to the electrode, electrostatic adsorption force acts between the electrode and the deflection mirror surface 651 so that one edge portion of the deflection mirror surface 651 is pulled toward the electrode. Hence, alternate application of a predetermined voltage from the pivot driver 102b upon the electrodes 658a and 658b vibrates the deflection mirror surface 651 reciprocally about the pivot axis AX which are the torsion springs 654. When the drive frequency for obtaining the reciprocal vibrations is set to the resonance frequency of the deflection mirror surface 651, the deflection mirror surface 651 vibrates at a large amplitude and the edge portions of the deflection mirror surface 651 consequently get displaced to positions which are in the vicinity of the electrodes 658a and 658b. Further, as the edge portions of the deflection mirror surface 651 reach the positions close to the electrodes 658a and 658b owing to resonance, the electrodes 658a and 658b contributes to driving of the deflection mirror surface 651, and the edge portions of the deflection mirror surface 651 and the both electrodes disposed on a flat surface accordingly make it possible to more stably maintain the vibrations.

Although the foregoing has described that an electrostatic adsorption force reciprocally vibrates the deflection mirror surface 651 according to this embodiment, other diving method such as an electromagnetic force for instance may be used to vibrate the deflection mirror surface 651. Driving of the deflection mirror surface 651 by means of electromagnetic force is already a well known technique, and hence, will not be described here.

The exposure unit 6 will be further described, referring back to FIGS. 3 and 4. The scanning light beam which is made scan by the deflector 65 as described above is emitted from the deflector 65 toward the photosensitive member 2, and this scanning light beam is imaged on the photosensitive member 2 via the scanning lens 66 and the return mirror 67 which correspond to the "second optical system" of the present invention, and a spot of the light beam is consequently formed on the surface of the photosensitive member. The scanning light beam in this manner scans parallel to the main scanning direction X and a line-like latent image which elongates in the main scanning direction X is formed at a scan position 21 on the photosensitive member 2 as shown in FIG. 5.

In this embodiment, at the start or end of the scanning light beam, return mirrors 69a through 69c guide the scanning light beam from the deflector 65 to the synchronization sensor 60 as shown in FIG. 3. In short, in this embodiment, the synchronization sensor 60 functions as a horizontal synchronization reading sensor which is for obtaining a synchronizing signal in the main scanning direction X, namely, a horizontal synchronizing signal.

Next, the relationship between the first distance R1 and the second distance R2 will be described in detail. To begin with, needless to mention, shortening the first distance R1 and the second distance R2 is effective in reducing the size of the apparatus. However, as described above, the movable plate 653 pivots at a high speed in order to deflect the light beam L in the main scanning direction X in this embodiment. While this creates friction between the movable plate 653 and air and heat consequently develops, the amount of the generated heat is relatively large in the main scanning direction but relatively small in the direction of the pivot axis. Noting this, different countermeasures are taken for the direction of the pivot axis and the main scanning direction in this embodiment. In other words, the light beam L is converged in the sub scanning direction Y within the sub-scanning surface (i.e., the plane of FIG. 4) and focused as a line image in the vicinity of the deflection mirror surface 651 in the deflector 65. This reduces the size Hb of the deflection mirror surface 651 in the direction Y of the pivot axis (the sub scanning direction). Meanwhile, since the amount of heat generation is relatively small in the direction of the pivot axis and the influence of the heat is minor, the first distance R1 can be set relatively short. Adopting such a structure remarkably contributes to size reduction of the deflector 65 and the exposure unit 6.

On the contrary, the influence of the heat is serious in the main scanning direction. In other words, as air resistance against the movable plate 653 grows, heat develops in the vicinity of the both ends of the movable plate 653 in the main scanning direction X and air fluctuates in the surrounding space (denoted at SA in FIG. 11). Considering this, in this embodiment, the apparatus is structured that the second distance R2 is longer than the first distance R1. In short, the movable plate 653 and vertical side portions (second adjacent portions) 652b are widely apart from each other in the main scanning direction X. This reduces air resistance against the movable plate 653, and hence, the amount of heat generation.

While the dimension of the movable plate 653 is not limited to any particular dimension, with the size Hb of the movable plate 653 in the direction Y of pivot axis reduced and made shorter than the size Ha in the main scanning direction X, the amount of friction between the both ends of the movable plate 653 and air surrounding these in the main scanning direction X is reduced. This further reduces the amount of heat generation. This is also advantageous for size reduction of the apparatus.

Figure 11:
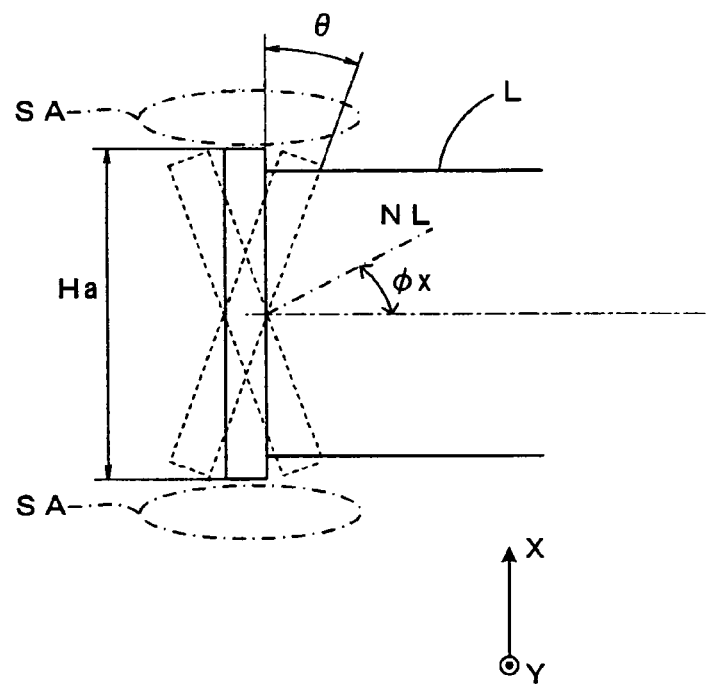
FIG. 11 is a main-scanning cross sectional view which shows the relation between a movable plate and a light beam.
Figure 12:
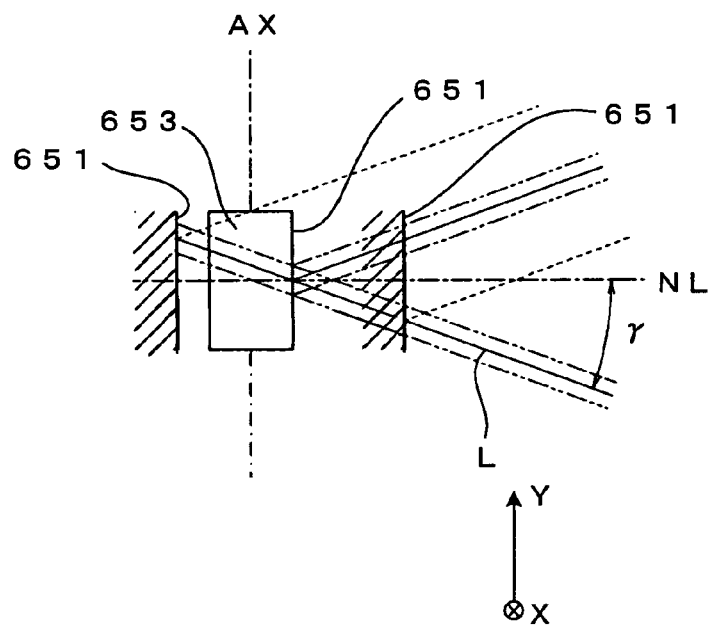
FIG. 12 is a sub-scanning cross sectional view which shows the relation between the movable plate and the light beam.
Figure 13:
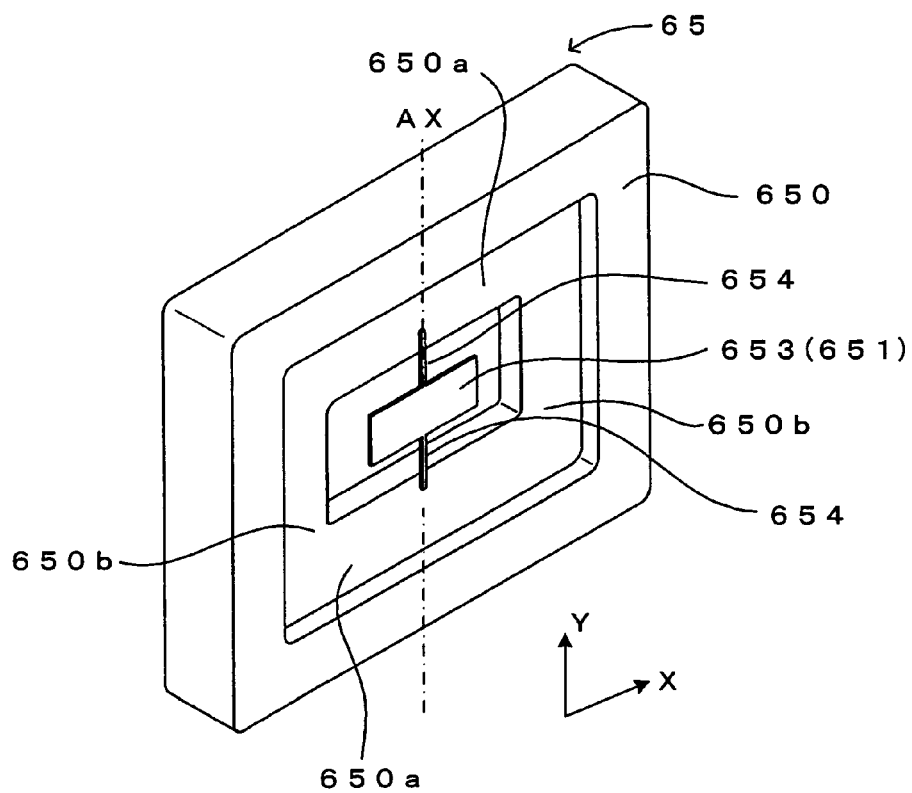
FIGS. 13 and 14 are drawings of a deflector, which is one of components which form the exposure unit, of another embodiment.
Figure 14:
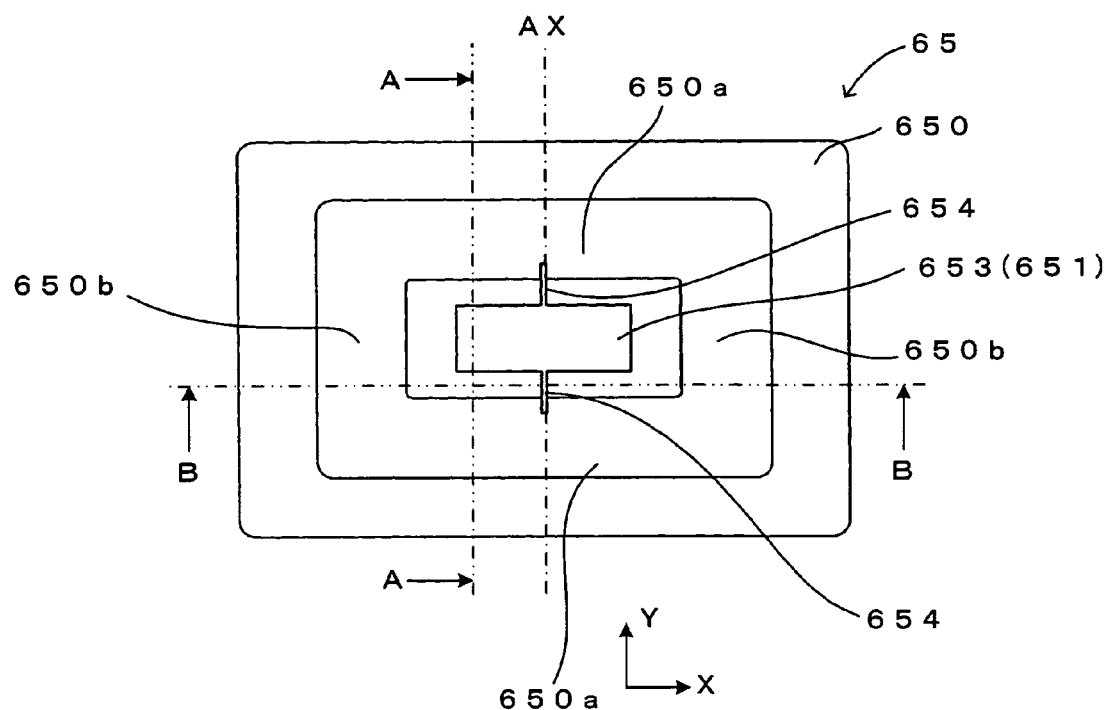
Figure 15:
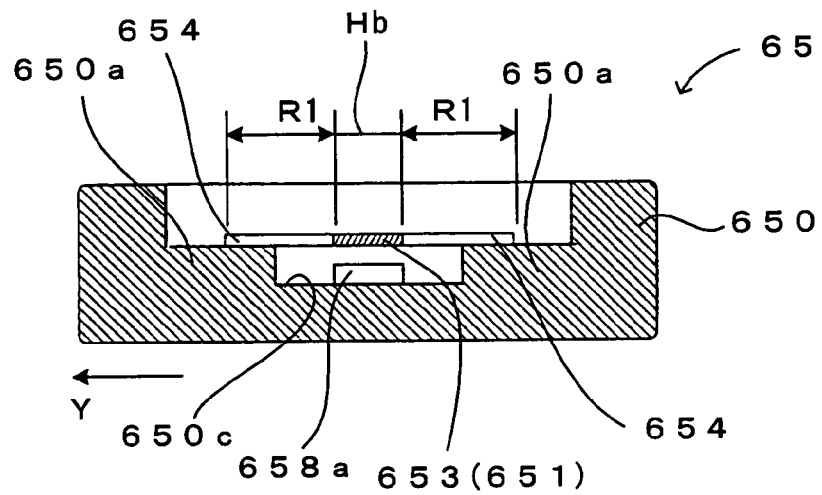
FIG. 15 is a cross sectional view taken on line A—A of FIG. 14.
Figure 16:
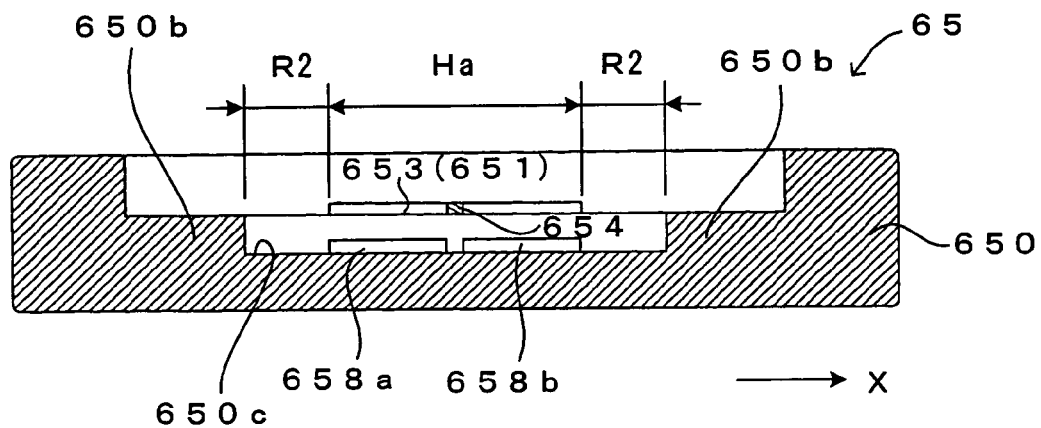
FIG. 16 is a cross sectional view taken on line B—B of FIG. 14.

In this embodiment, as shown in FIGS. 11 and 12, the light beam L from the first optical system 63 is incident upon the deflection mirror surface 651 from the front side of the deflection mirror surface 651 and along the direction Y of the pivot axis at an acute angle with respect to the surface normal NL to the deflection mirror surface 651. Owing to this, the light beam L travels in the space other than the surrounding space SA mentioned above, namely, the space in the vicinity of the central section of the deflection mirror surface. This realizes scanning with the light beam without thermal influence.

Making the light beam L impinge upon the deflection mirror surface 651 from the front side as described above not only solves the heat problem but also greatly contributes to size reduction of the apparatus. In short, since the light beam L is incident upon the deflector 65 from the front side of the deflection mirror surface 651 in this embodiment, when the pivot angle of the deflection mirror surface 651 is zero, the angle of incidence of the light beam upon the deflection mirror surface 651 within the main scanning surface is zero. As the pivot angle θ of the deflection mirror surface 651 increases, the angle of incidence φx of the light beam L upon the deflection mirror surface 651 increases as shown in FIG. 11 for instance, and the angle (=90°−φx) at which the deflection mirror surface 651 slices the incident light beam L within the main scanning surface (the plane of FIG. 11) becomes an acute angle which however is still larger than that in the conventional apparatus. Hence, the size of the deflection mirror surface 651 along the main scanning direction X which is needed to cover a predetermined range of scanning is smaller than that in the conventional apparatus, and as a result, the length Ha of the movable plate 653 in the main scanning direction X is relatively short. Further, the light beam L which is incident upon the deflection mirror surface 651 is shaped into an elongated cross sectional shape which elongates in the main scanning direction X by the first optical system 63, and the movable plate 653 is finished as an elongated strip which elongates in the main scanning direction X. In other words, the width Hb of the movable plate 653 in the direction of the pivot axis (the sub scanning direction Y) which is approximately orthogonal to the main scanning direction X is remarkably narrow. In the exposure unit 6 having such a structure therefore, the weight of the movable plate 653 is lightened and the movable plate 653 can pivot stably at a faster speed than in the conventional apparatus. This allows that the light beam L scans on the surface of the photosensitive member 2 stably at a high speed and a latent image is formed in a stable manner.

The present invention is not limited to the embodiment above, but may be modified in various manners in addition to the preferred embodiments above, to the extent not deviating from the object of the invention. For example, although the horizontal side portions (first adjacent portions) 652a, the vertical side portions (second adjacent portions) 652b, the movable plate 653 and the torsion springs (beams) 654 are made of the silicon substrate 652 in single-piece in the embodiment described above, the structure of the movable plate 653 and the torsion springs 654 is not limited to this. The present invention may be applicable to an exposure unit which comprises the deflector 65 in which the movable plate 653 and the torsion springs 654 are formed in single-piece and the single-piece unit is attached to the frame 650 as shown in FIGS. 13 through 16 for instance. In this deflector 65, the respective torsion springs 654 are fixed to horizontal side portions 650a of the frame 650. The horizontal side portions 650a correspond to the "first adjacent portions" of the present invention while vertical side portions 650b of the frame 650 correspond to the "second adjacent portions" of the present invention. Where the deflection mirror surface 651 is driven by electromagnetic force, a magnetic force source such as a permanent magnet and an electromagnet is often disposed next to the movable plate 653 in the main scanning direction X. Hence, when such a driving method is used, the magnetic force source corresponds to the "second adjacent portion" of the present invention.

Further, in the embodiment above, although the light beam L is incident upon the deflection mirror surface 651 from below along the direction Y of the pivot axis, the light beam L may be incident from above along the direction of the pivot axis. In addition, the direction of incidence is not limited to the incidence from the front side. Rather, the present invention is applicable also to an optical scanning apparatus in which a light beam is incident upon a deflector along a main-scanning surface as in the conventional apparatus for instance. That is, the present invention is generally applicable to any optical scanning apparatus in which first and second adjacent portions are arranged adjacent to a movable member which has a deflection mirror surface and a light beam scans as the movable member which is held by beams for free pivoting pivots about a pivot axis.

In addition, although the optical scanning apparatus according to the present invention is used as an exposure unit of a color image forming apparatus, the present invention is not limited to this. In other words, the optical scanning apparatus according to the present invention may be used as an exposure unit of an image forming apparatus in which a light beam scans on a latent image carrier such as a photosensitive member to thereby form an electrostatic latent image, the electrostatic latent image is developed with toner and a toner image is formed. Of course, the application of the optical scanning apparatus is not limited to an exposure unit which is disposed to an image forming apparatus, but generally includes any optical scanning apparatus which makes a light beam scan on a surface-to-be-scanned.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An optical scanning apparatas in which a light beam scans on a surface-to-be-scanned in a main scanning direction, comprising:

a deflector which comprises a movable member which has a deflection mirror surface which reflects an incident light beam toward the surface-to-be-scanned, first adjacent portions which are fixedly disposed adjacent to said movable member over a first distance from said movable member on the both sides of said movable member in a direction of a pivot axis which is approximately orthogonal to the main scanning direction, second adjacent portions which are fixedly disposed adjacent to said movable member over a second distance from said movable member in the main scanning direction, a frame in which said first adjacent portions and said second adjacent portions are formed integral with each other, a pair of electrodes each of which is fixedly attached to said frame at a predetermined position, and beams which elongate in the direction of the pivot axis and link said movable member to said first adjacent portions to thereby hold said movable member such that said movable member freely pivots about the pivot axis, said deflector making said movable member pivot about the pivot axis, thereby deflecting the incident light beam in the main scanning direction;

a light source which emits the light beam;

a first optical system which shapes the light beam from said light source into an elongated cross sectional shape which elongates in the main scanning direction, and makes the light beam impinge upon said deflection mirror surface; and a second optical system which makes the light beam deflected by said deflection mirror surface form an image on the surface-to-be-scanned, wherein the second distance is longer than the first distance, said movable member and said beams are formed integral with each other, said beams are fixedly attached to said frame, and the light beam, by means of said first optical system is incident upon said deflection mirror surface from a front side of said deflection mirror surface in such a direction;

that a beam plane includes the pivot axis and is orthogonal to the main scanning direction, the beam plane being a plane which is formed by an optical axis of said first optical system and a surface normal, which passes the pivot axis, to said deflection mirror surface when a pivot angle about the pivot axis of said movable member is zero; and that the optical axis is at an acute angle with respect to the surface normal to said deflection mirror surface.

2. The optical scanning apparatus of claim 1, wherein the size of said movable member in the direction of the pivot axis is shorter than the size of said movable member in the main scanning direction.

3. The optical scanning apparatus of claim 1, wherein said movable member and said beams are made of silicon single crystal.

4. An image forming apparatus, comprising:
said optical scanning apparatus of claim 1; and
a latent image carrier, wherein
said optical scanning apparatus makes the light beam scan on a surface of said latent image carrier, thereby forming an electrostatic latent image on said latent image carrier.

* * * * *